US006564283B1

(12) United States Patent
Ahn

(10) Patent No.: US 6,564,283 B1
(45) Date of Patent: May 13, 2003

(54) DATA PROCESSING SYSTEM FOR EXPANDED ADDRESSES

(75) Inventor: Jong-Keun Ahn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/575,763

(22) Filed: May 22, 2000

(30) Foreign Application Priority Data

May 20, 1999 (KR) ............................................. 99-18342

(51) Int. Cl.[7] .............................................. G06F 12/06
(52) U.S. Cl. .......................................... 711/2; 711/212
(58) Field of Search ................ 711/1, 2, 212; 710/3

(56) References Cited

U.S. PATENT DOCUMENTS

| 4,340,932 A | * 7/1982 | Bakula et al. ................. 711/2 |
| 5,590,302 A | * 12/1996 | Tanaka ......................... 711/206 |
| 5,771,363 A | * 6/1998 | Mitsuishi et al. ............ 712/200 |
| 5,819,078 A | * 10/1998 | Farrell et al. .................. 711/2 |
| 6,233,659 B1 | * 5/2001 | Cohen et al. ............... 711/153 |

FOREIGN PATENT DOCUMENTS

JP   2000357088 A   * 12/2000 ............ G06F/9/34

WO   WO 02/13001 A1 * 2/2002 ........... G06F/9/318

OTHER PUBLICATIONS

IBM Technical Disclosure Bulletin, "Extending the Addressing Capabilities of the IBM Series/1 to 32 bits", Sep. 1, 1986, vol. 2 issue 4, p. 1494–1501.*
R.K. Bell et al., "The Big Three– Today's 16–bit Microprocessors", IEEE 1980, pp. 125–138.*

* cited by examiner

*Primary Examiner*—Matthew Kim
*Assistant Examiner*—Pierre-Michel Bataille
(74) *Attorney, Agent, or Firm*—F. Chau & Associates, LLP.

(57) ABSTRACT

A microprocessor capable of functioning in an expanded address mode is disclosed, including: a control unit for determining whether an external instruction is to be used for a normal address mode or to be used for an expanded address mode and for generating control signals; a program counter for generating a first address in response to an output from the control unit during the normal and expanded address modes; an address generator for generating a second address during the expanded address mode, in response to an output from the control unit; an address bus for transferring the first address out of the microprocessor; and a data bus for transferring the second address out of the microprocessor. The microprocessor also includes an address interface circuit for transferring the second address out of the microprocessor through the data bus.

6 Claims, 15 Drawing Sheets

Fig. 7A

BANK 1

| | | |
|---|---|---|
| 0000h | LD | Ax, 0h |
| 0001h | LCALL | 4h, TARGET |
| 0002h | LD | Bx, 50h |

BANK 4

| | | |
|---|---|---|
| 0000h | ADD | Ax, 30h |
| | ⋮ | |
| 1521h | TARGET : | |
| | ADD | Bx, 2h |
| | ⋮ | |
| 1533h | RET | |
| | ⋮ | |

Fig. 7B

| Call Instruction |
|---|
| LCALL 4h. TARGET : Pseudo instruction |
| (LD    PCX,4h    : Set bank 4<br>call    rarget)    : ①Call subrountine<br>(Target - 16 bit address) |
| RET Instruction |
| TARGET : ...<br>        RET    : ②Return |

Fig. 7C

| INT Instruction |
|---|
| Interrupt/Fast Interrupt code sequence Change (To Store PCL/PCH/PCX) |
| IRET Instruction |
| IRET        : ② Return |

Fig. 7D

| Data Access Instruction | |
|---|---|
| LADD  4H, [RR0], R0 | : Pseudo Instruction |
| (LD   DCX,4h | : Set bank 4 |
|  ADD  [RR0],R0) | : Indexed ADD |

DATA PROCESSING SYSTEM FOR EXPANDED ADDRESSES

This application relies for priority upon Korean Patent Application No. 1999-18342, filed on May 20, 1999, the contents of which are herein incorporated by reference in their entirety.

BACKGROUND OF THE INVENTION

1. Field of the Invention

The present invention is in the field of data processing systems and is more specifically related to data processing systems capable of addressing expanded memories.

2. Description of Prior Art

Processor technology is developing at a rapid pace lead by precision manufacturing processes and the needs of new high performance applications. These applications are highly functional, and complex, occupying a large amount of storage. in memory devices. Typically, a microprocessor has a fixed memory capacity, for example, a 16-bit processor is limited to 64 kilobytes (Kb) of memory. To increase the available memory space in a 16-bit processor to 1 Mb, for example, a 20-bit memory address system is needed.

Several methods are known for expanding the memory address of a 16 bit processor, such as, segmentation, bank switching and use of memory management units (MMU).

MMUs use virtual addressing wherein the main memory is divided into pages. These pages, or memory addresses, can be divided into two parts, the page address and an offset within the page. The MMU takes a virtual address and uses the page address as an index to a page table. The page table contains a physical page address. This physical page is concatenated with the offset to produce the physical address, which is used to address the main memory. Despite the performance of MMUs, their disadvantages include, large size and expensive costs.

Prior art FIGS. 1A and 1B illustrate address expansion using segmentation. A 16-bit segment base address is transferred to 16-bit segment base register 12 through address bus 18. The 16-bit segment base address is converted to a 20-bit segment base address by shifting the least significant 4 bits to the left. A 16-bit offset address is stored in an offset register 14, and then converted to a 20-bit offset address by inserting a hexadecimal number "0." Adder 16 generates a 20-bit expanded address by adding the 20-bit segment base address and offset address. However, the segmentation method shown in FIGS. 1A and 1B cannot be adapted to a processor system that has address accessing features other than a 16-bit system.

Prior art FIGS. 2A and 2B illustrate a bank switching address expanding method. Each memory bank is assigned a bank number. A main memory is divided into 16 memory banks. The bank number units, each consisting of four bits, select the 16 memory banks. A 16-bit base address is stored in address register 22 through address bus 25. A 16-bit offset address, stored in offset address 23, is added to the 16-bit base address in adder 26, and the sum is applied to combination logic block 27. The combination logic block 27 combines the 4-bit memory bank address supplied from bank number register 24 with the summed 16-bit address supplied from the adder 26, and then transfers the combined result, i.e., a 20-bit expanded address, to address bus 28. In the bank switching process, same interrupt routines are stored in the same regions of the memory banks when an interrupt occurs, or an independent bank switching is carried out as each memory bank is activated by its own program. Since the switching operation for each memory bank is enabled while a program is running, codes assigned to switching for the same region in a memory cannot be changed. Thus, such a switching feature has many limitations in a system employing an interrupt service routine.

In a von Neumann machine, like those described above, the program and the data occupy the same memory. The machine has a program counter (PC) which points to the current instruction in memory. The PC is updated on every instruction. When there are no branches, program instructions are fetched from sequential memory locations. A majority of commercial processors use von Neumann architecture.

Unlike von Neumann architecture, Harvard architecture has a separated memory structure, i.e., a program memory and a data memory. It is difficult to provide an expanded address for both the program and data memories.

Therefore, a need exists for a reliable system and method for expanding a 16-bit memory address built on current hardware.

There are two ways to expand addressing with 16-bit processors; one is to create new instructions for the expanded addresses and the other is to establish combination codes from existing instructions.

In order to expand addressing by creating new instructions, instructions relevant to addressing memory locations or defined instruction sets involving frequently used instructions are needed. Even though creation of new instructions maintains the adaptability of the processor without modifying existed instructions, it causes a topological burden on hardware construction in CISC (Complex Instructions Set Computer) microprocessors. In these processors, almost all instructions are referred to their own memories. Another possibility is the creation of the instructions only for frequently used instructions for the purpose of reducing the topological burden on hardware. However, this approach limits the actual number of instructions available to perform the expanded address modes.

Alternatively, combination codes can be employed. In this approach a bank register is set up by instruction LOAD, and subsequent instructions are carried out in a selected memory bank after an address stored in the bank register is assigned to the most significant address of the memory bank. While this method does not burden the hardware topology, an arrangement of instructions for saving and restoring addresses of the bank registers, SAVE/RESTORE, becomes complicated when instructions for calling subroutine and returning, CALL/RET, are active, and addresses of the bank registers cannot be stored therein during a bank interrupt. Further, it is difficult to access a data memory in a Harvard processor having a divided memory structure of program and data memories.

Therefore, a need exists for a 16-bit (2-byte) memory addressing system, which can efficiently be expanded to accommodate 24-bit (3byte) addresses using existing processor systems. This system is more desirable than an instruction structure modified to 24-bit (3-byte), for expanded addressing because a 24-bit structure cannot handle conventional 16-bit code.

Additionally, a need exists for a system and method of setting existing instructions into instructions for normal addresses, and new instructions for the expanded address areas are created therein. Further, a programmable control unit in a microprocessor is needed to detect whether an external instruction is the normal address mode instruction or the expanded address mode instruction, and then perform a control operation.

SUMMARY OF THE INVENTION

It is an object of the invention to provide a microprocessor system capable of accessing an expanded address structure.

It is another object of the invention to provide a von Neumann microprocessor system capable of accessing an expanded address structure for a data memory.

It is another object of the invention to provide a Harvard microprocessor system capable of accessing an expanded address structure for program and data memories.

In order to accomplish these objects, a microprocessor according to one embodiment of the present invention includes: a control unit for determining whether an external instruction is to be used for a normal address mode or to be used for a expanded address mode and for generating control signals; a program counter for generating a first address in response to an output from the control unit during the normal and expanded address modes; an address generator for generating a second address during the expanded address mode, in response to an output from the control unit; an address bus for transferring the first address out of the microprocessor; and a data bus for transferring the second address out of the microprocessor.

The microprocessor also includes an address interface circuit for transferring the second address out of the microprocessor through the data bus. The address interface circuit includes: an address register for storing the second address supplied through the data bus; and a latch circuit for holding the second address stored in the address register therein. The control unit makes an external interrupt be inhibited until the first and second addresses are transferred out of the microprocessor when the external instruction is to be used for the expanded address mode.

In another embodiment of the present invention, a microprocessor includes: a control unit for determining whether an external instruction is to be used for a normal address mode or to be used for a expanded address mode and for generating control signals; a program counter for generating a first instruction address in response to an output from the control unit during the normal and expanded address modes; an address generator for generating a first data address during the normal and expanded address modes, and for generating a second instruction address and a second data address during the expanded address mode, in response to an output from the control unit; an instruction address bus for transferring the first instruction address out of the microprocessor; a data address bus for transferring the first data address out of the microprocessor; and a data bus for transferring the second instruction and data addresses out of the microprocessor. An address interface circuit employed in the microprocessor, for transferring the second instruction and data addresses out of the microprocessor through the data bus, includes: an instruction address register for storing the second instruction address supplied through the data bus; a first latch circuit for holding the second instruction address stored in the instruction address register therein; a data address register for storing the second data address supplied through the data bus; and a second latch circuit for holding the second data address stored in the instruction address register therein.

BRIEF DESCRIPTION OF THE DRAWINGS

The preferred embodiments of the present invention will be described with reference to the drawings wherein:

FIGS. 7A and 7D show features of expanded address mode instructions stored in memory devices according to one embodiment of the present invention;

In the figures, like reference numerals denote like or corresponding parts.

DETAILED DESCRIPTION OF PREFERRED EMBODIMENTS

Preferred embodiments of the present invention will be described below in more detail with reference to the accompanying drawings.

Figure 1A:
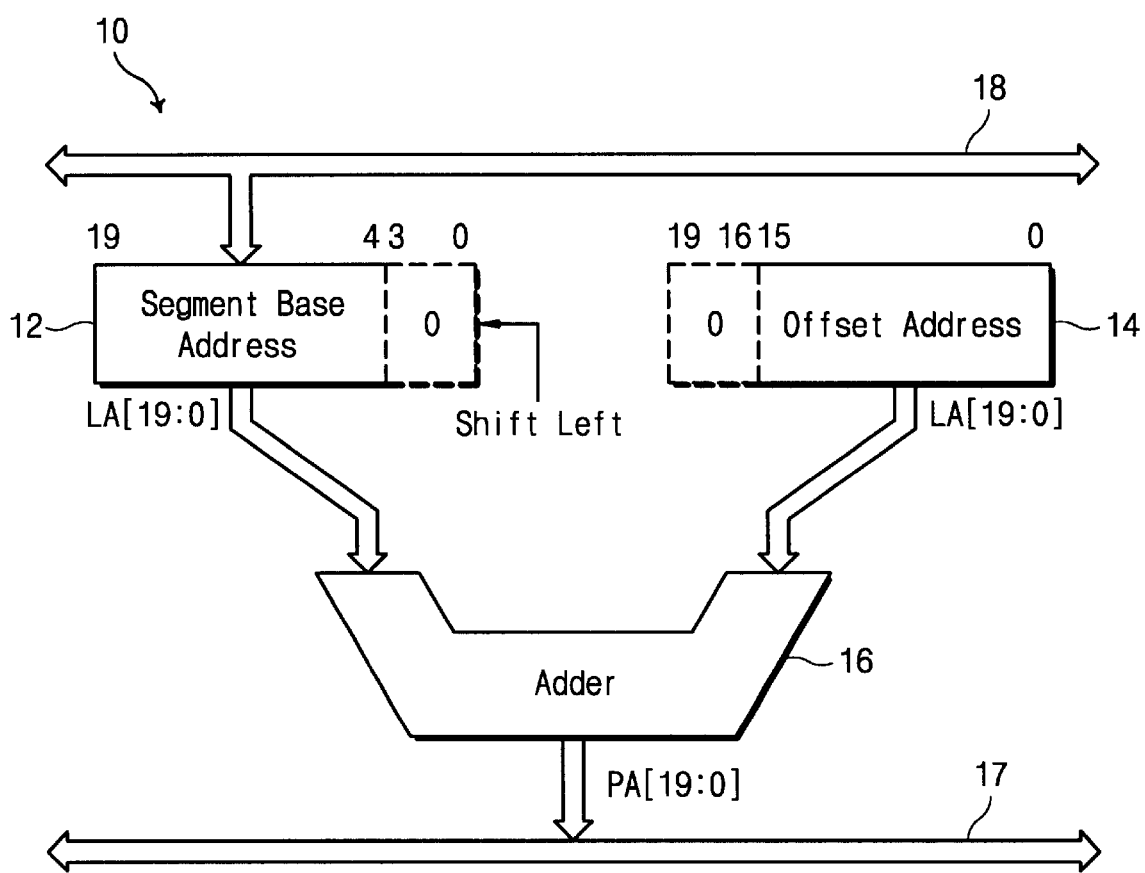
FIGS. 1A and 1B are schematic views illustrating conventional arrangements of segmentations for expanding addresses.
Figure 1B:
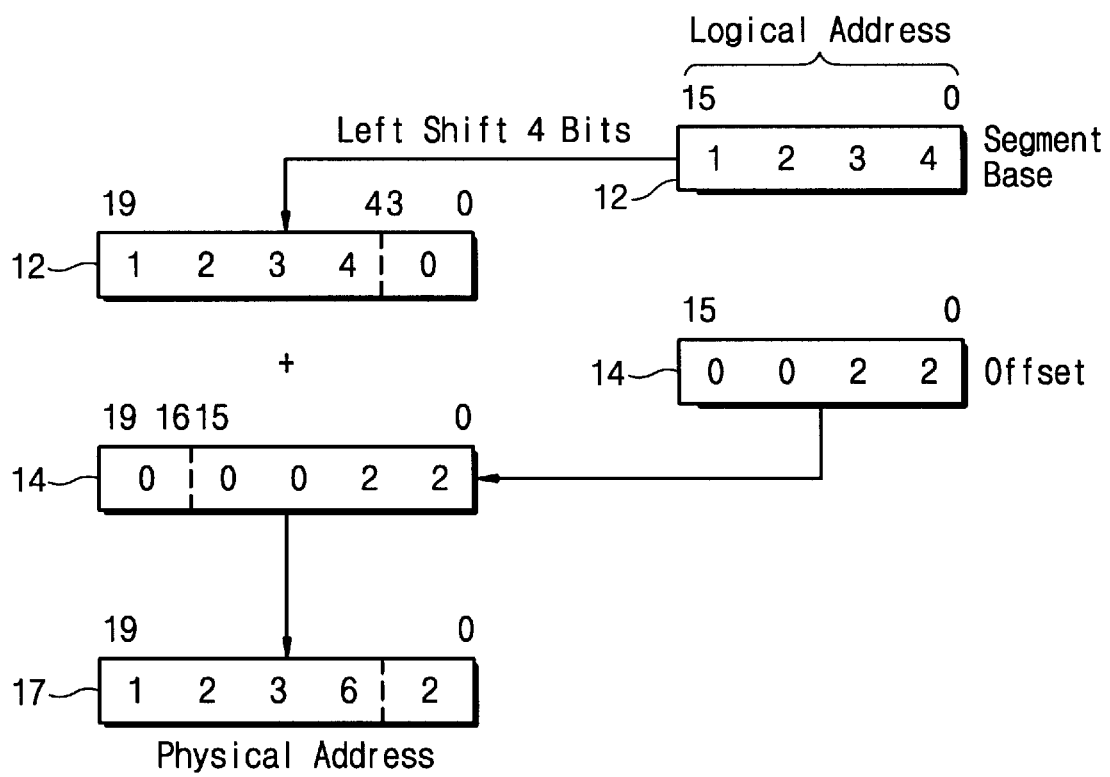
Figure 2A:
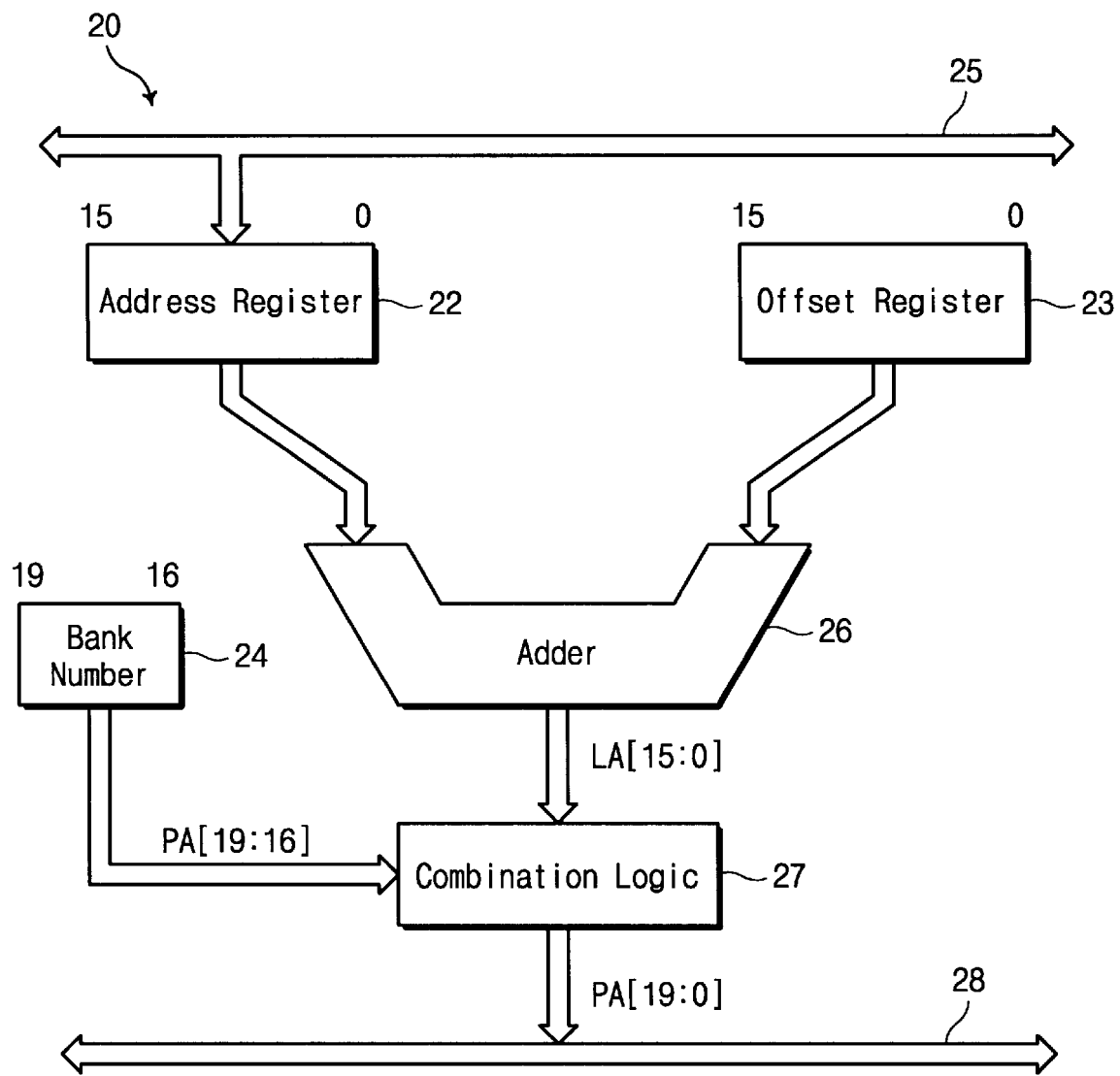
FIGS. 2A and 2B are schematic views illustrating conventional arrangements of bank switching for expanding memories.
Figure 2B:
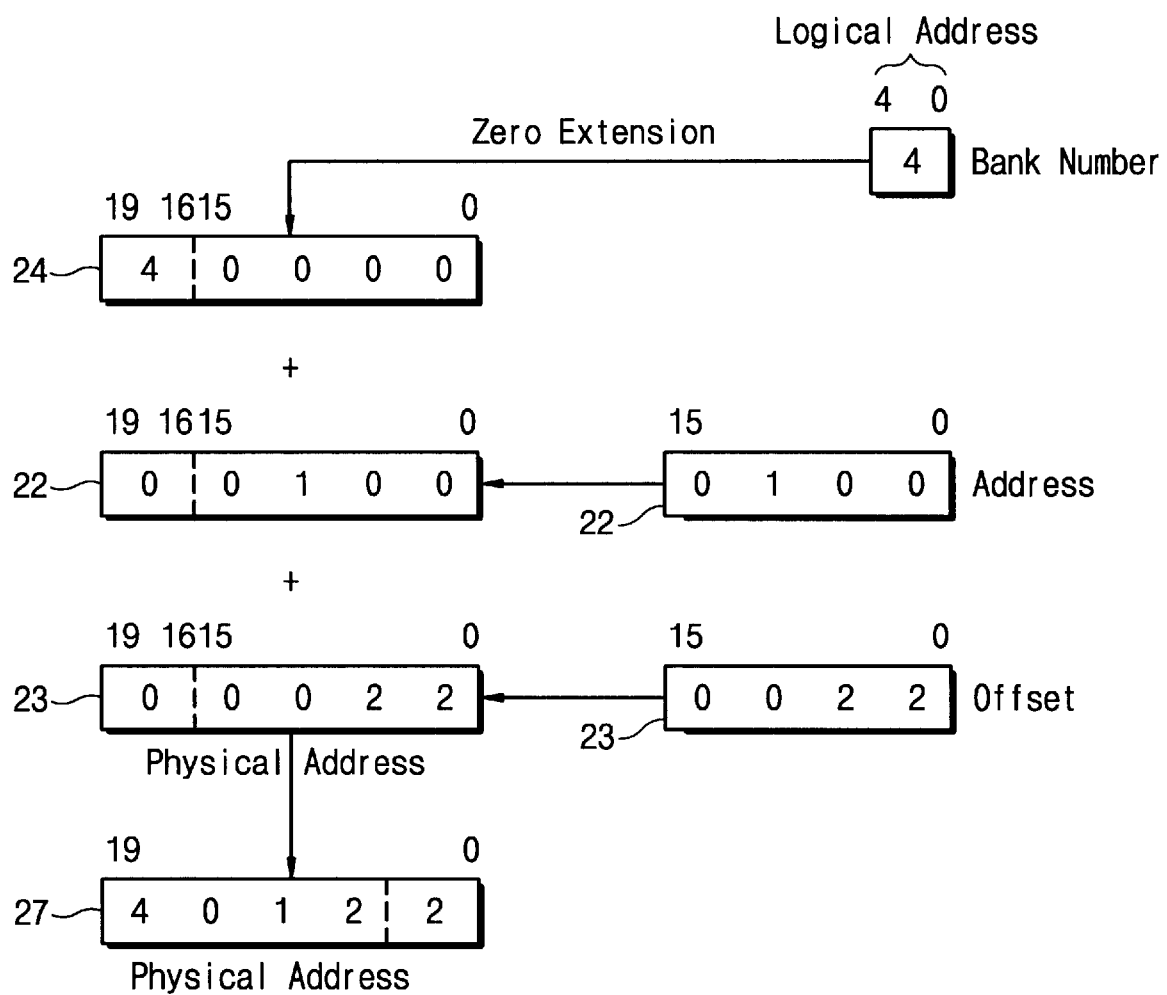
Figure 3:
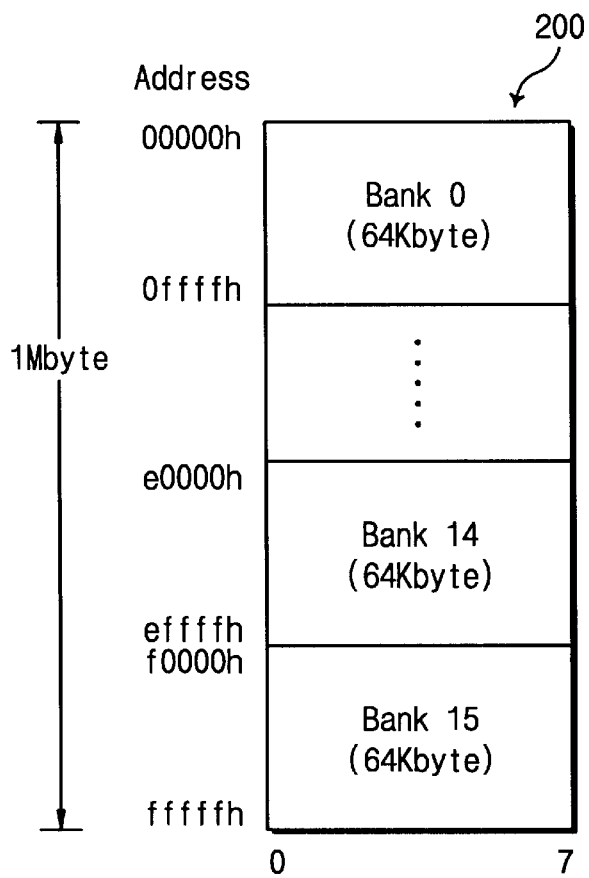
FIG. 3 shows an external memory device according to one embodiment of the present invention.
Figure 4:
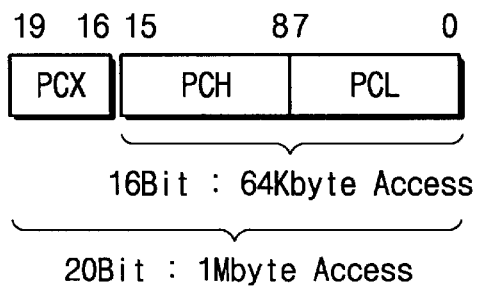
FIG. 4 shows a program counter for designating addresses of the memory shown in FIG. 3 according to one embodiment of the present invention.

FIG. 3 illustrates an external memory device in accordance with one embodiment of the present invention. The memory device 200 includes an 8-bit data structure having a capacity of 1 megabyte (Mb), and divided into 16 memory banks assigned to the lower 4-bit addresses from "000h" to "fffh." The capacity of each memory bank is 64Kb. A 16-bit program counter PCH/PCL of FIG. 3, for designating addresses on the memory device of FIG. 3, is embedded in a 16-bit microprocessor, and appoints the lower 16-bit addresses of the external memory device 200. An additional program counter PCX designates the upper 4-bit addresses of the external memory device 200.

Figure 5:
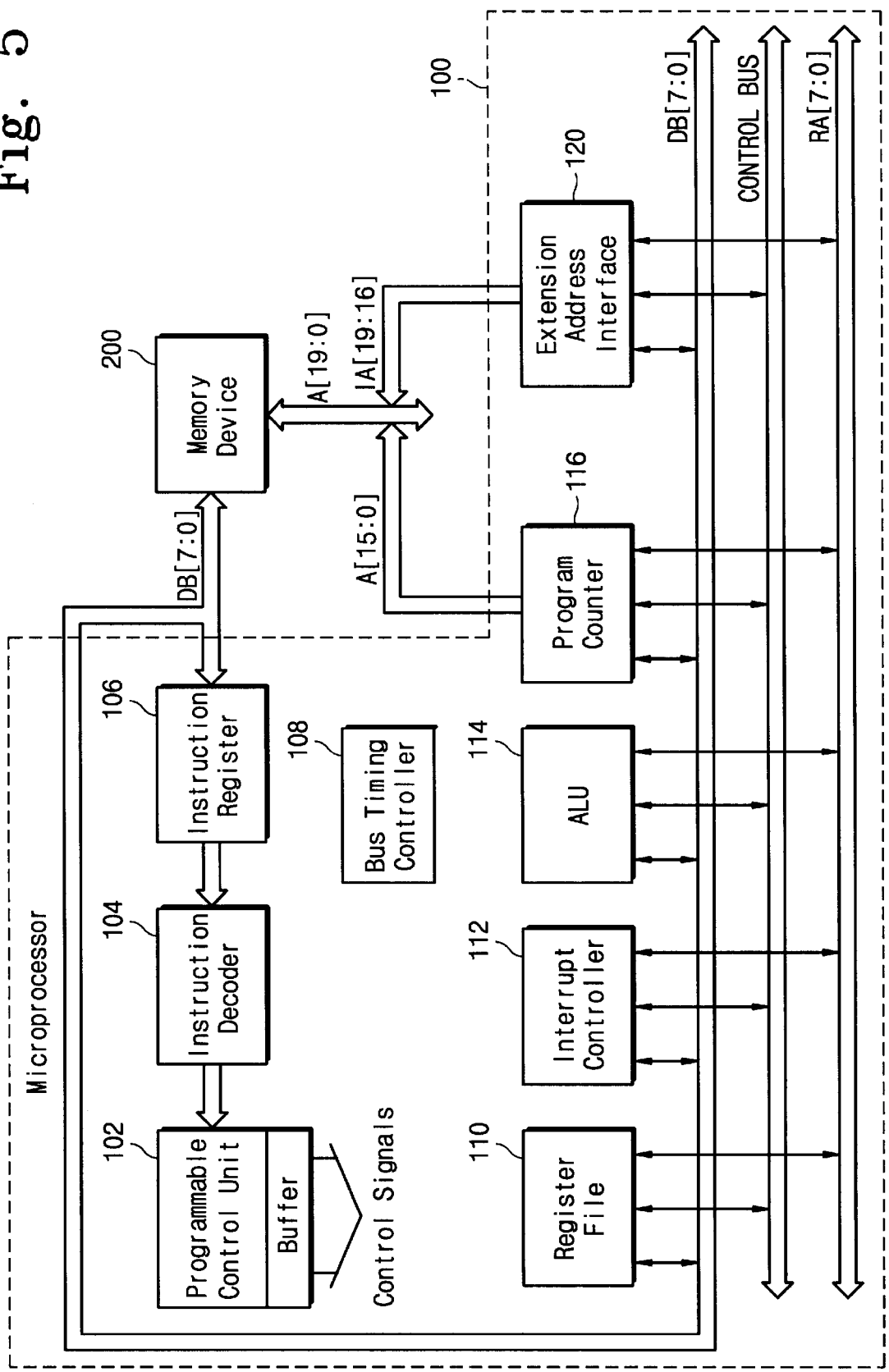
FIG. 5 is a block diagram illustrating a microprocessor with von Neumann architecture according to a preferred embodiment of the invention.

Referring to FIG. 5, illustrating a microprocessor 100 with von Neumann architecture, according to a preferred embodiment. The microprocessor 100 has a 16-bit address bus, and an 8-bit data bus, and is connected to the external memory device 200 of FIG. 3. The 16-bit address bus is coupled to the lower sixteen bits out of the 20-bit address for the external memory device 200. According to FIG. 5, the system includes a programmable control unit 102, an instruction decoder 104, an instruction register 106, a bus timing controller 108, a register file 110, an interrupt controller 112, an ALU (Arithmetic Logic Unit) 114, a program counter 116, an expanded address interface 120, an 8-bit data bus DB[7:0], a 16-bit address bus AB[7:0], a control bus (CB) and an 8-bit register address bus RA[7:0].

The instruction register 106 receives instructions from the memory device 200 through the data bus DB during a fetch step. The instruction decoder 104 receives and decodes an instruction stored in the instruction register 106 and then generates an address corresponding to the instruction, during an execution step. The programmable control unit 102 includes a micro-code ROM (not shown) and generates control signals corresponding to the address supplied from the instruction decoder 104. The control signals generated from the programmable control unit 102 controls the bus timing controller 108, register file 110, interrupt controller 112, the ALU 114 and the program counter 116. The control signals from control unit 102 are preferably connected to the CONTROL BUS, which in turn is connected to the above-mentioned components. The register file 110 is a group of registers to be utilized for temporarily storing data or addresses, and is preferably operable like a stack. The interrupt controller 112 performs an overall interrupt control operation for the microprocessor in response to incoming interrupt signals. The ALU 114 receives the control signals from the programmable control unit 102 and data or addresses from the instruction decoder 104 and carries out arithmetic and logical computing operations. The program counter 116 makes 16-bit addresses for designating the memory banks, each of which includes 64 Kb of memory.

Figure 6:
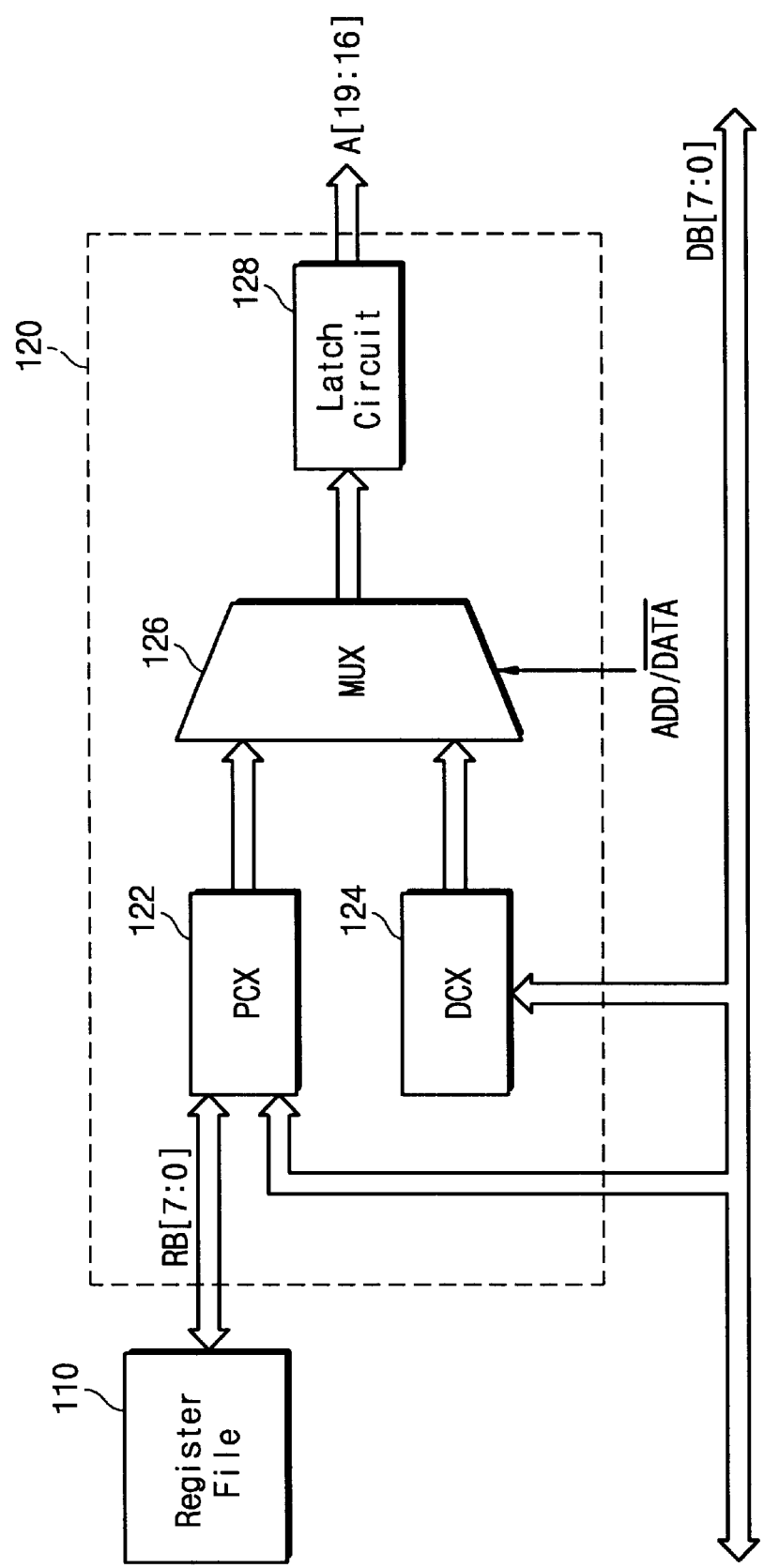
FIG. 6 shows a structural arrangement of the expanded address interface shown in FIG. 5 according to one embodiment of the present invention.

The expanded address interface 120, as shown in FIG. 6, includes an additional program counter (PCX) 122, an additional data/address counter (DCX) 124, a multiplexer 126 and a latch circuit 128. Since in von Neumann architecture, the program and the data occupy the same memory, the program and data fields in the memory device are accessible by alternatively coupling the PCX 122 and DCX 124 to the address bus. For example, the PCX 122 is loaded on the upper bits of the address bus during an instruction fetch step from the memory device, and during a data fetch step, the DCX 124 is coupled to the upper bits of the address bus synchronously with an access timing. Timing control for linking the outputs of counters with corresponding bits of the address bus is well known in the art. Selection signal ADDR/ of the multiplexer 126 is supplied from the programmable control unit 102.

It should be noted that when normal address mode instructions are applied thereto, addresses for the memory device 200 are provided to the memory device 200 from the program counter 116 through the address bus AB. Further, when expanded address mode instructions are applied thereto, the lower 16-bit addresses are provided to the memory device 200 from the program counter 116 through the address bus AB, and the upper 4-bit addresses stored at the expanded address interface 120 are provided to the memory device 200. At that time, when the lower 16-bit addresses are generated after the upper 4-bit is selected and latched in the interface, 20-bit addresses can be applied to the memory device 200.

There is a need for changing the micro-operation with the expanded address mode instructions when the addresses of the additional program counter is modified by an instruction such as JUMP that changes the order of program routines, or CALL that calls a subroutine.

FIGS. 7A and 7D illustrates an expanded address mode instruction "LCALL 4h, TARGET" of address "0001h." The instruction is supplied while instructions from memory bank 1 of the external memory device 200 are subsequently introduced therein. The instruction "LCALL 4h, TARGET" allows the present routine be branched to subroutine "TARGET" of memory bank 4, causing the following micro-program be performed:

LD PCX, 4h

CALL TARGET

The above-mentioned micro-program assigns bank 4 to the PCX 122, and the program counter receives address "1512h," the address of label "TARGET." At this time, the value of address "0002h," which is increased by one by the program counter 116, and the address of the PCX 122, are stored in the register file 110 through the data bus. From the address "1512h" of the bank 4, the program is performed by adding values from the program counter 116 without changing the value from the PCX 122 until the next instruction for the expanded address mode. If the instruction for returning, RET, is enabled while the instructions from bank 4 are introduced, the returning address held in the register file 110, i.e., the address "0002h" of the bank 1, is assigned to PCX 122 by the instruction POP and program counter 116. Therefore, the program counter points to the addresses "0002h" which is next to address "0001h" of bank 1, in which the subroutine-call CALL has been carried out.

In the prior art, a microprocessor cannot properly operate to store the expanded addresses of the PCX during the branch for a subroutine, after expanded addresses of the PCX 122 is entered into the register file 110 by the instruction PUSH. Advantageously, according to an embodiment of the preferred invention, when a subroutine-branching or an interrupt occurs, the addresses stored in the register file 110 returns to the original addresses, according to the instruction POP, during a subroutine-return or the end of the interrupt operation.

An example of the expanded address mode instructions for accessing data stored in expanded memory locations will be explained with reference to FIGS. 7A through 7D. Instruction "LADD 4h, [RR0], R0" adds R0 to the data of the address RR0 of bank 4, and is assigned to the micro-program as follows:

LD DCX, 4h

ADD [RR0], R0

After the DCX 124 is assigned to the bank 4 by means of the instruction "LD DCX, 4h" before accessing data stored in a expanded memory location, the data stored in the DCX 124 is loaded simultaneously with an output of the address RR0 through the address bus by the instruction ADD. Thus, the expanded memory location can be accessed by means of the DCX 124 and address RR0.

The TABLE 1 shows a comparison of the execution cycles of a micro-program in accordance with normal address mode instructions with execution cycles of the micro-program, when the normal address mode instructions are modified into expanded address mode instructions, in the microprocessor "SAM87RC" of SEC.

TABLE 1

| Instruction | For Normal Address Mode | For Expanded Address Mode |
|---|---|---|
| INT | 16 cycle | 18 cycle |
| INT (fast) | 8 cycle | 6 cycle |
| IR (int/ext) | 1 byte/10 (12) cycle | 1 byte/12 (14) cycle |
| IR (fast) | 1 byte/6 cycle | 1 byte/6 cycle |
| CALL DA | 3 byte/14 cycle | 3 byte/16 cycle |
| CALL IA/IRR | 2 byte/14 cycle | 2 byte/15 cycle |

As shown in the TABLE 1, the number of cycles in the expanded address mode is greater than that in the normal address mode by 2 cycles because of the operations PUSH and POP for the expanded addresses. Such an increase in the number of execution cycles for the expanded address mode is due to the data bus's 8-bit capacity.

The TABLE 2 shows the number of execution cycles and delay rates in the expanded address mode, in view of nine instructions included in the frequently used instruction group of 80%.

TABLE 2

| Order | Instructions | Using Freq. (%) | The Number Of Cycles | Delay rate | |
|---|---|---|---|---|---|
| 1 | JR cc.RA | 11.06 | 6 | 11.06 * 4/6 = | 7.3% |
| 3 | CALL DA1 | 7.45 | 14 | 7.45 * (4 + 2)/14 = | 3.1% |
| 5 | JP cc.DA | 5.90 | 8 | 5.9 * 4/8 = | 2.95% |
| 10 | RET | 2.96 | 10 | 2.96 * 2/10 = | 1.78% |
| 17 | LDW RR1.1ML | 1.74 | 8 | 1.74 * 4/8 = | 0.87% |
| 18 | BTJR r2.B.RA | 1.61 | 10 | 1.61 * 4/10 = | 0.64% |
| 19 | LDC r2.1rr2.xL | 1.46 | 14 | 1.46 * 4/14 = | 0.42% |
| 73 | IRET | 0.12 | 10 | 0.12 * 2/10 = | 0.02% |
| 74 | INT | 0.12 | 16 | 0.12 * 2/16 = | 0.01% |
| Total | | | | | 17.11% |

With reference to TABLE 2, because of the increased of the number of execution cycles (by about 17%) in the expanded address mode, the instruction LOAD must be performed before the instructions JMP and CALL are used. However, the fast interrupt operation can be carried out at the same speed as the normal mode because there is no need for storing the values of the program counter in a stack.

It should be noted that, as an offset address is employed in a related address instruction mode or in an indexed address instruction mode, an arithmetic operation, such as adding or subtracting, the offset address to or from a base address, may cause an abnormal bank switching to occur when a bank address remains unchanged even though a current address is counted over a boundary address of a corresponding memory bank. Conventional solutions to overcome this problem include using a full adder or an internal ALU in a microprocessor, or using an adder to increment or decrement the bank address and to create signals for controlling those functions.

According to one embodiment of the present invention, an assembler or a compiler detects the address mode instruction involved in the offset address and determines whether a current address is over the bank address when the offset address is adding or subtracting to or from the base address. The address of the PCX 122 can be changed for expanding memory locations without preparing an additional adder. By determining whether a present address mode instruction is the relative address mode instruction or the indexed address mode instruction in the assembler or the compiler, a warning message is generated when the current address is over the bank address and then the instruction LD is pre-positioned, to perform a bank switching operation, before a corresponding address mode instruction. It is also possible for a user to insert the instruction LD, if the user recognizes the warning message. Since almost all of microprocessors currently used are operable with micro-codes programmed by the assembler, a user may change the bank address without a help of the compiler.

The address stored in the PCX 122 or the DCX 124 can be changed even before carrying out the next instruction when an interrupt occurs after the expanded address mode instruction has been introduced. For example, if an interrupt instruction, occurring before carrying out "CALL TARGET" and after performing "LOAD PCX, 4h," forces the address of the PCX 122 to designate bank 5, the returning position of the program after the interrupt service routine, is connected to the instruction "CALL TARGET." At this time, the micro-program "CALL TARGET" designates "TARGET" to the bank 5, not the original location "TARGET" of the bank 4, resulting in a malfunction (changing the bank address to be accessed). To alleviate the problem, when the expanded address mode instruction is introduced, the programmable control unit 102 generates a masking signal, INT_MASK, to inhibit an input of an external interrupt instruction until the next instruction is performed after setting the PCX 122 or the DCX 124.

Figure 8:
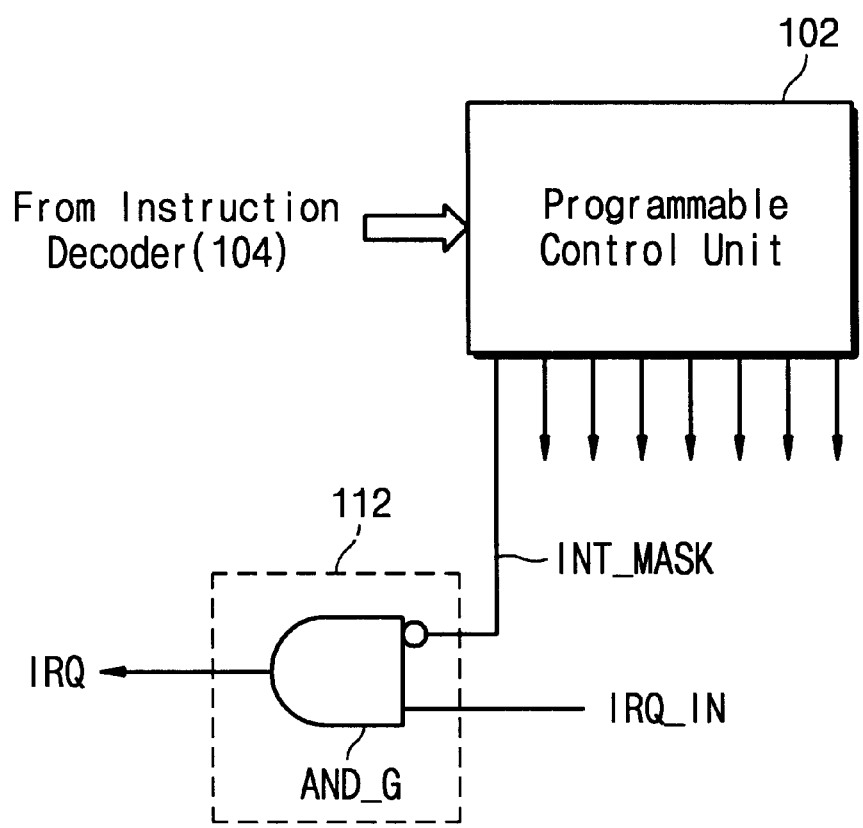
FIG. 8 shows a programmable control unit and an interrupt controller, for masking an interrupt request signal that comes thereto when the expanded address mode instruction is enabled according to one embodiment of the present invention.
Figure 9:
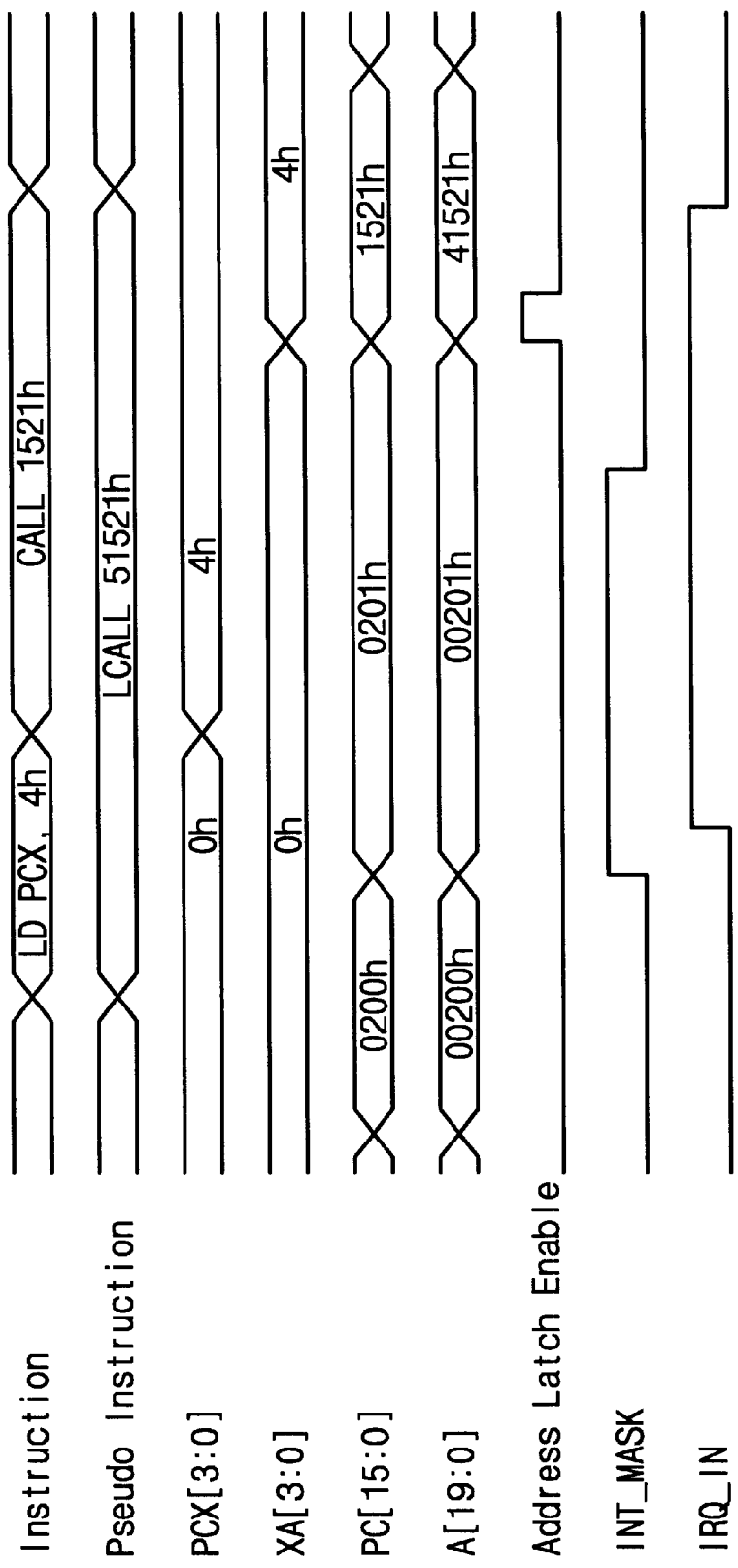
FIG. 9 is a timing view while the expanded address mode instruction is active according to one embodiment of the present invention.

Referring to FIG. 8, the programmable control unit 102 determines whether an instruction currently supplied is an expanded address or not, and then performs a microprogram corresponding to the determination. If the expanded address mode instruction "LCALL 4h, TARGET" is introduced, the programmable control unit 102 generates the interrupt masking signal, INT_MASK, that is enabled with high level from a beginning of the "LOAD PCX, 4h" to a termination of "CALL TARGET" and applied to interrupt controller 112 including an AND gate. The signal INT_MASK is applied to one input of the AND gate and external interrupt requesting signal, IRQ_IN, to the other input of the AND gate. Thus, the interrupt requesting signal IRQ_IN to be applied to function blocks of a microprocessor is disabled when the interrupt masking signal, INT_MASK, is high level, even though IRQ_IN is active.

With respect to a continuity of address boundaries between banks (memory banks), there are two ways of positioning an instruction without using an adder for the bank switching by adding or subtracting an offset address to or from a base address; one is to increment an address value of the PCX 122 from the last address value by one and then to move to the first address of the next bank; and the other is to insert no-operation instruction, NOP, until the last address of the present bank by means of the jumping instruction, JUMP, after changing a set-up for the PCX 122 by the bank-switching instruction "LD PCX, xh." The positioning of the instructions is available for the convenience of a user with no effect on the processing of the program in the microprocessor.

Figure 10:
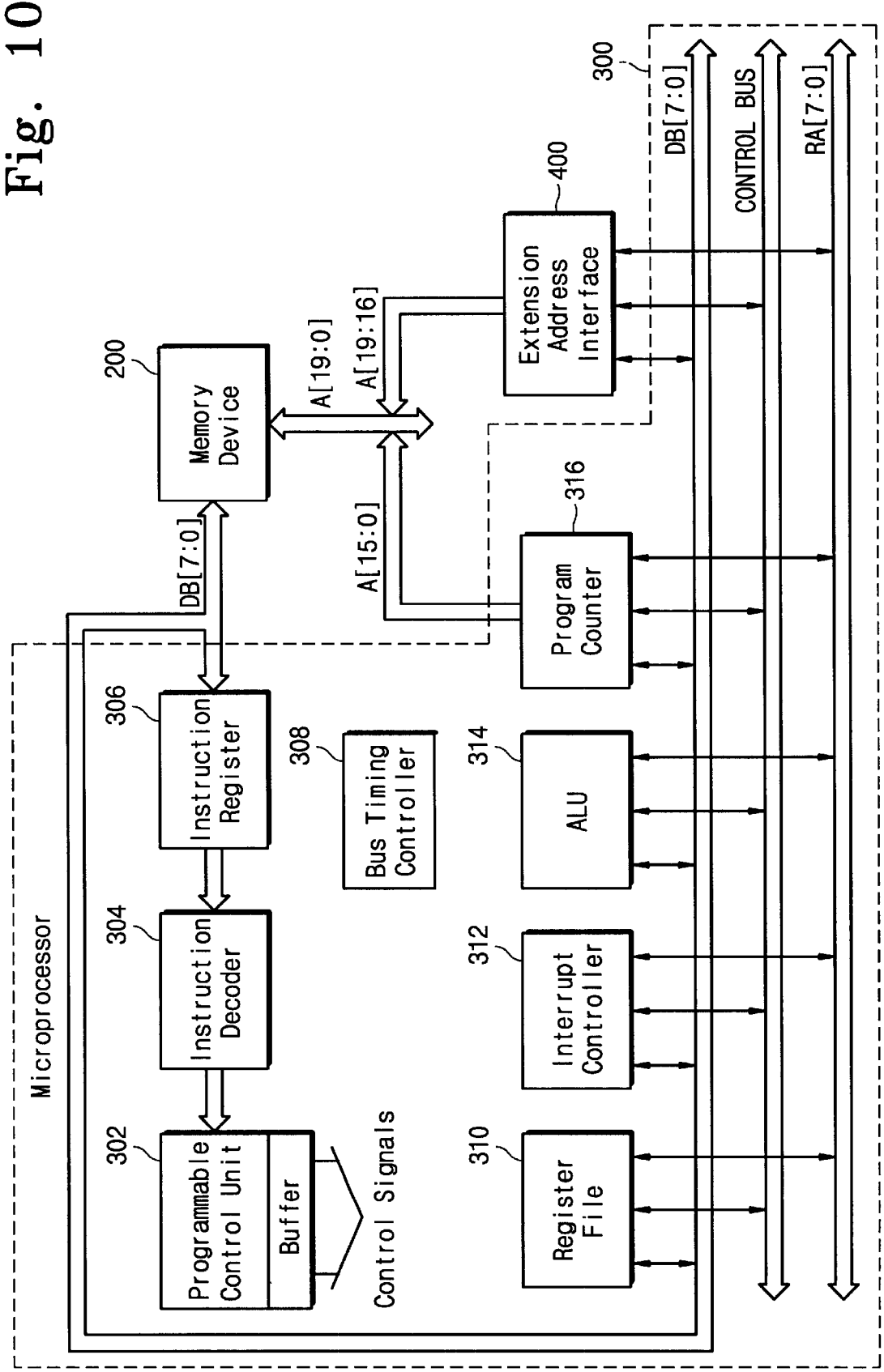
FIG. 10 shows another embodiment of a data processing system modified from that of FIG. 5 according to the present invention.

FIG. 10 illustrates another embodiment of the present invention, applied in the context of von Neumann architecture in which an expanded address interface 400 is located outside of the microprocessor 300. The expanded address interface 400 controls transformation of the expanded address between the microprocessor 300 and the external memory device 200, and is connected to data bus DB[7:0], control bus (CB), and register address bus RA[7:0]. The operation of the microprocessor 300 is the same as that of the microprocessor 100 of FIG. 5, except that the expanded address interface 400 is physically located outside of the microprocessor 300.

Figure 11:
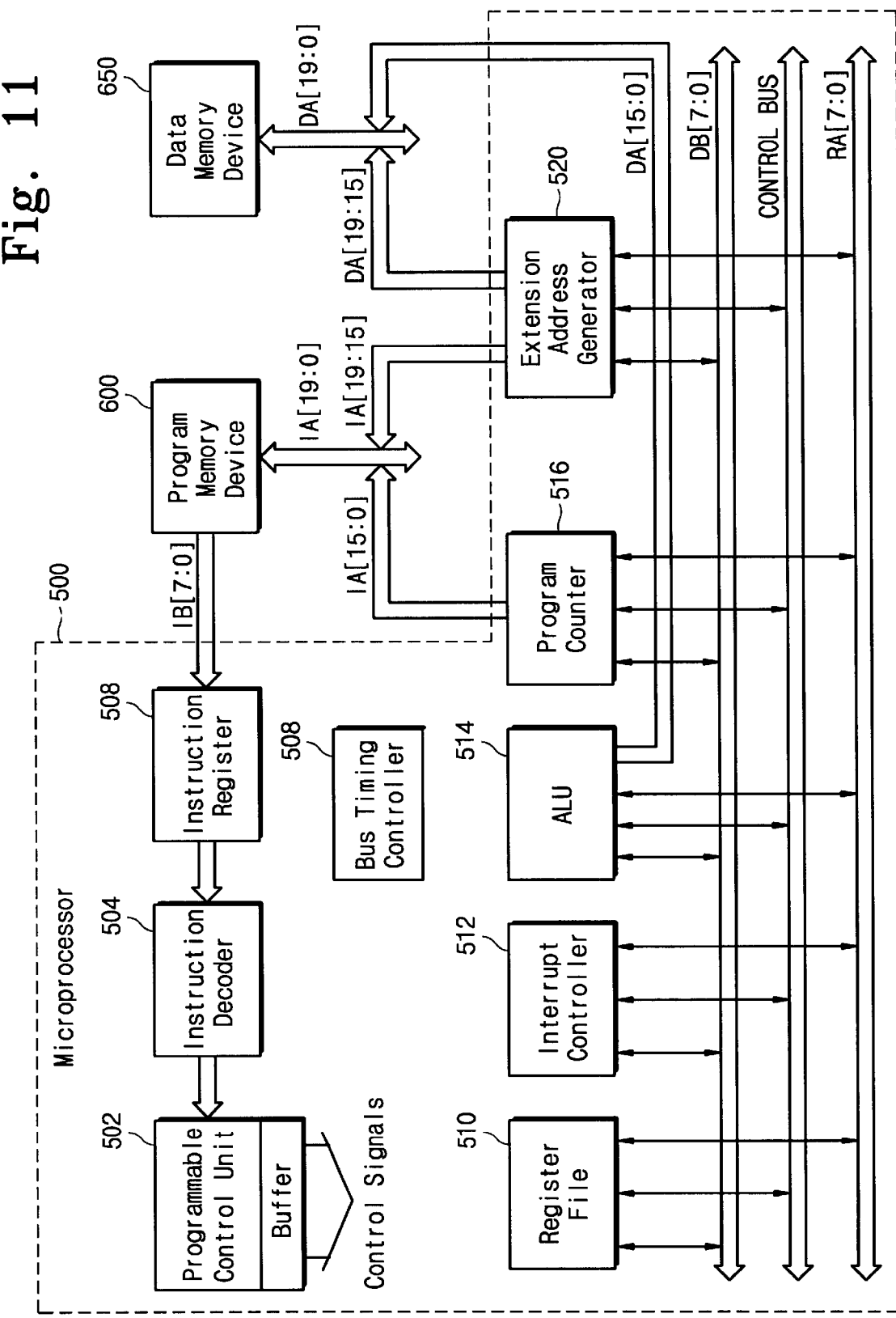
FIG. 11 is a block diagram illustrating a microprocessor with Harvard architecture according to a preferred embodiment of the invention.
Figure 12:
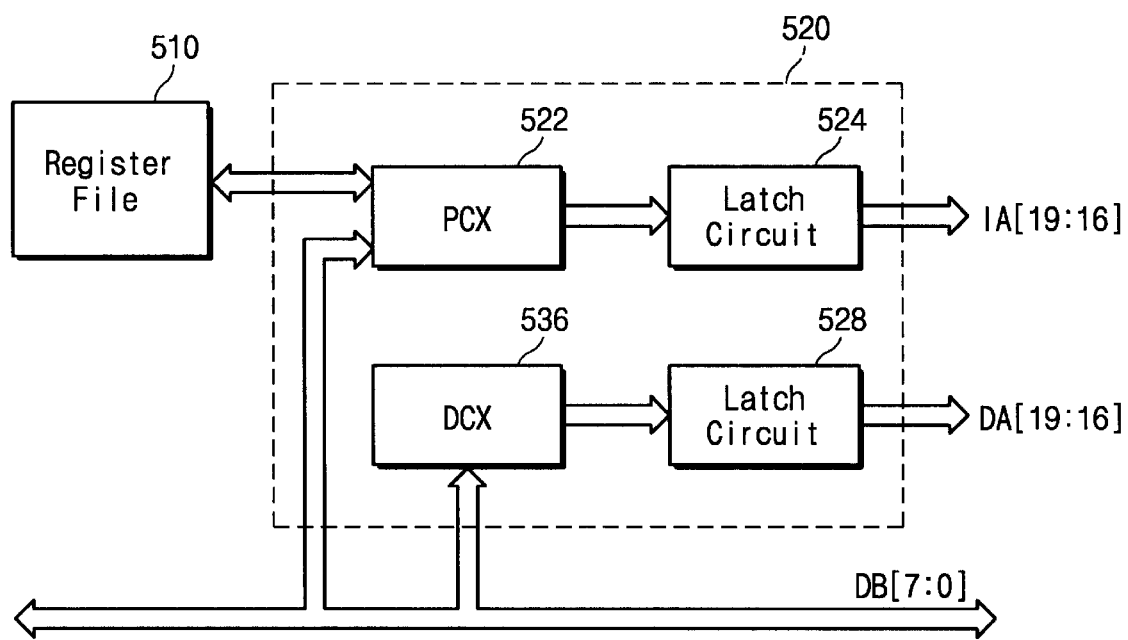
FIG. 12 shows a structural arrangement of the expanded address interface shown in FIG. 11 according to one embodiment of the present invention.

FIG. 11 shows a Harvard type processor according to one embodiment of the present invention. A microprocessor 500 with Harvard architecture is distinguished from other microprocessors in that the external memory device is divided into a program memory device 600 and a data memory device 650. The internal construction of the microprocessor 600 is the same as microprocessors 100 and 500, except for the instruction address bus IA[15:0] of 16-bit and data address bus DA[15:0] of 16-bit. The data addresses are generated from ALU 314. Referring to FIG. 12, expanded address interface 520 includes expanded program counter (PCX) 522, expanded data address counter (DCX) 526 and latch circuits 524 and 528. In the Harvard architecture, the program and data memory devices are separate, as well as the instruction and data address buses. The address from PCX 522 is transferred to program memory device 600 through the instruction address bus IA after being stored in the latch circuit 524, and the address from the DCX 526 is transferred to the data memory device 650 through data address bus DA after being stored in the latch circuit 528.

Figure 13:
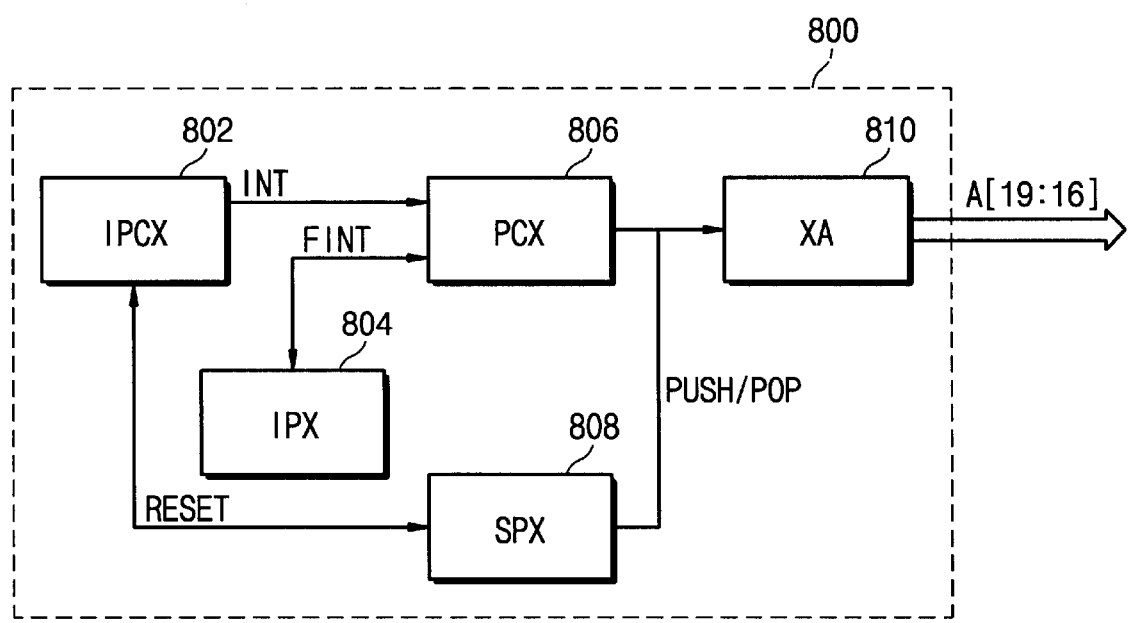
FIG. 13 shows a structural arrangement of an expanded address interface, including a register storing interrupt service routines, stack pointers, and fast interrupt service routines, by means of a bank switching method with utilizing PCX/DCX according to one embodiment of the present invention.

FIG. 13 illustrates yet another embodiment of the expanded address interface according to the present invention, in order to extend the bank switching function with the PCX and DCX, the system includes an additional register for storing the positions of the interrupt service routine, the fast interrupt service routine and stack pointer. As shown in FIG. 13, since the interrupt, the fast interrupt and stack PUSH/POP operations are available to be performed in a predetermined bank by IPCX 802, IPX 804, and SPX 808, there is no need for assigning the interrupt service routine and stack to specified regions.

As described above, the present invention provides various architectures for a processor capable of functioning with expanded addressing without modifying hardware structure. Furthermore, the invention makes it possible to accomplish a reliable bank switching operation without preparing an additional adder.

Although specific constructions and procedures of the invention have been illustrated and described herein, it is not intended that the invention be limited to the elements and constructions disclosed. One skilled in the art will easily recognize that the particular elements or sub-construction may be used without departing from the scope and spirit of the invention.

What is claimed is:

1. A system for address expansion in a microprocessor comprising:

a programmable control unit for determining whether an external instruction is to be used for a normal address mode or to be used for an expanded address mode and for generating control signals;

a first program counter for generating a first address in response to an output from the control unit during the normal and expanded address modes;

an address generator for generating a second address during the expanded address mode, in response to an output from the control unit;

an address bus for transferring the first address out of the microprocessor; and a data bus for transferring the second address out of the microprocessor, wherein the first address is an instruction address and the second address is a data address, and, when an expanded address mode instruction is introduced, the programmable control unit generates a masking signal to inhibit an input of an external interrupt instruction until a next instruction is performed.

2. The system of claim 1, further comprising an address interface circuit for transferring the second address out of the microprocessor through the data bus.

3. The system of claim 2, wherein the address interface circuit comprises:

an address register for storing the second address supplied through the data bus; and a latch circuit for holding the second address stored in an address register therein.

4. A system for address expansion in a microprocessor comprising:

a programmable control unit for determining whether an external instruction is to be used for a normal address mode or to be used for an expanded address mode and for generating control signals;

a program counter for generating a first instruction address in response to an output from the control unit during the normal and expanded address modes;

an address generator for generating a first data address during the normal and expanded address modes, and for generating a second instruction address and a second data address during the expanded address mode, in response to an output from the control unit;

an instruction address bus for transferring the first instruction address out of the microprocessor;

a data address bus for transferring the first data address out of the microprocessor; and a data bus for transferring the second instruction and data addresses out of the microprocessor, wherein the programmable control unit inhibits an external interrupt until the first instruction and data addresses, and the second instruction and data addresses are transferred out of the microprocessor when the external instruction is to be used for the expanded address mode.

5. The system of claim 4, further comprising an address interface circuit for transferring the second instruction and data addresses out of the microprocessor through the data bus.

6. The system of claim 5, wherein the address interface circuit comprises:

an instruction address register for storing the second instruction address supplied through the data bus;

a first latch circuit for holding the second instruction address stored in the instruction address register therein;

a data address register for storing the second data address supplied through the data bus; and a second latch circuit for holding the second data address stored in the instruction address register therein.

* * * * *